United States Patent [19]
Baumann

[11] Patent Number: 5,718,410
[45] Date of Patent: Feb. 17, 1998

[54] SMALL FLOW CONTROL VALVE WITH CARTRIDGE TYPE SEATING ARRANGEMENT

[76] Inventor: Hans D. Baumann, 32 Pine St., Rye, N.H. 03870

[21] Appl. No.: 546,533

[22] Filed: Oct. 20, 1995

Related U.S. Application Data

[63] Continuation-in-part of Ser. No. 380,003, Jan. 27, 1995, Pat. No. 5,516,079.

[51] Int. Cl.⁶ ................................................ F16K 51/00
[52] U.S. Cl. ........................ 251/61.5; 251/159; 251/174; 251/191
[58] Field of Search .................. 251/61.2, 61.4, 251/61, 171, 174, 191, 159, 61.5; 137/454.5

[56] References Cited

U.S. PATENT DOCUMENTS

| | | | |
|---|---|---|---|
| 1,791,610 | 2/1931 | Yarnall | 251/191 |
| 2,252,923 | 8/1941 | Granetz | 251/159 |
| 2,696,967 | 12/1954 | Wilson et al. | 251/174 |
| 3,211,419 | 10/1965 | Klinger-Lohr | 251/191 |
| 3,997,141 | 12/1976 | Baumann | 251/205 |
| 4,009,863 | 3/1977 | Tolnai | 251/174 |
| 5,288,054 | 2/1994 | Bake et al. | 251/174 |

*Primary Examiner*—A. Michael Chambers

[57] ABSTRACT

A small flow control valve with cartridge type seating arrangement is shown and described. A conventional valve housing with inlet and outlet ports and a seat ring cartridge. A plug with a lower throttling profile engages within the seat ring bore. A deformable seal is provided and is capable of being deformed by a metal collar radially inwardly to compress the exterior of the upper contoured plug portion to prevent leakage in the closed valve position. The collar is held in constant compression by a circular spring placed between the collar and a groove located within a bore of the cartridge. The valve further has an actuating device adjustably attached thereto.

11 Claims, 1 Drawing Sheet

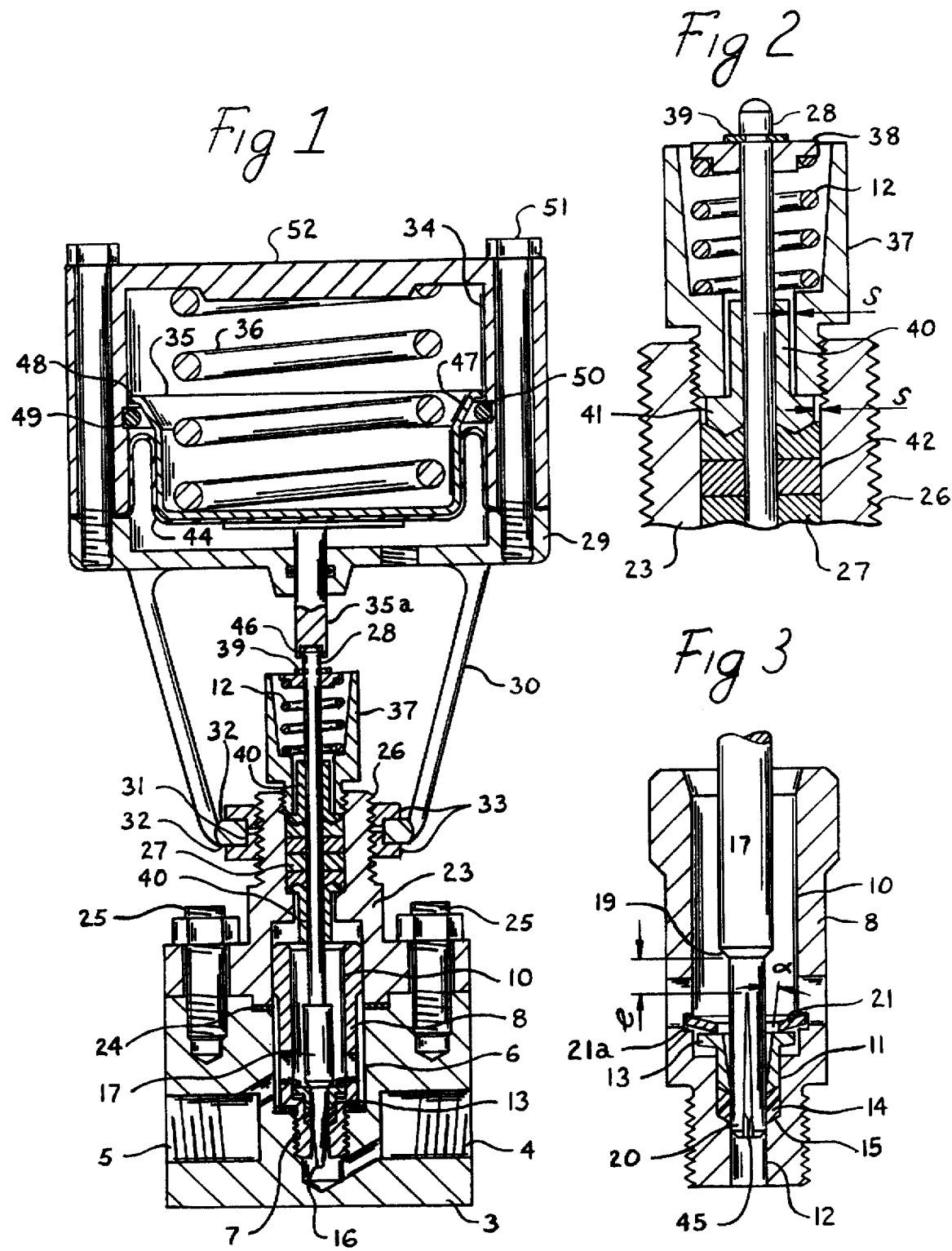

SMALL FLOW CONTROL VALVE WITH CARTRIDGE TYPE SEATING ARRANGEMENT

This is a continuation in part of my patent application Ser. No. 08/380,003 filed 01/27/95 now U.S. Pat. No. 5,516,079, issued May 14, 1996.

BACKGROUND OF THE INVENTION

My invention relates to automatic control valves operated either by a modulating electric or pneumatic signal to control very minute flow rates, as is customary in the operation of pilot plants in the chemical or petroleum industry. Control valves presently in use for this purpose are either of the low-lift variety utilizing a needle-type plug or the long lift cylindrical plug type with precision machined longitudinal scratch, commonly referred to as micro-splined plugs. Both of these types exhibit some problems. The needle-type plug is commonly limited to a tapered angle of 30° to avoid self-locking against the seat ring bore. This in turn reduces the stroke whenever small orifice sizes are required. For example, the maximum usable stroke for control with a 1/32 inch orifice is only 0.055 inch, i.e., much too short to achieve any meaningful positioning accuracy with conventional actuating devices. Another drawback is the very high tendency for fluids to cavitate with needle plugs resulting in early destruction of the valve parts.

The micro-splined plugs require extremely accurate machining of splined grooves having depths of less than 0.001 inch. The minimum controllable area, limiting the lowest flow rate that can be regulated, is given by the radial clearance between the external diameter of the plug and the orifice bore. With a normal radial clearance of 0.00025 inch, the minimum controllable area of such a plug with 1/4 inch diameter is $2 \times 10^{-4}$ in$^2$ or 25% of the maximum area of 1/32 inch dia. orifice, thereby limiting the ratio of max. to min. control area or rangeability to less than 4:1.

My invention, on the other hand, reduces the amount of radial clearance around the valve plug to virtually zero by the use of a spring-loaded and deformable plastic seat ring that is squeezed around the plug in the closed or nearly closed valve position. This is a major improvement over my prior invention shown in U.S. Pat. No. 3,997,141, which had no soft seat and, thereby, no tight shutoff capability.

The latter feature is important when extremely small flow rates of gaseous media need to be controlled. For example, the leak rate of 1/4" diameter needle trim with metal-to-metal may well exceed 10 cc/min at 100 psi pressure drop of air, which is well within the control range of many small flow valve applications.

To obtain tight shutoff of valves handling high pressure of 1000 psi or more has always been a challenge to a valve designer. One successful way of doing this is illustrated in my prior U.S. Pat. No. 3,809,362. Here, following metal-to-metal contact of a plug with a moveable seal, a plastic such as PTFE is compressed at a very high rate of pressure so that the plastic begins to flow, thereby, providing a highly viscous sealing media between the fluid pressure and the valve outlet. While this solution is very effective, it cannot be scaled down to plug sizes smaller than about 1/2" diameter.

A solution to find a workable alternative to such a trim mechanism is given in my present invention where a spring load is able to compress an annular PTFE (or similar plastic) insert as explained in more detail in the following description.

In prior art, serious alignment problems can occur whenever the seat ring bore is not machined together with the stem guide realizing that the clearance between plug and seat bore may be as low as 0.0002"; secondly, any contact between the seat ring and the housing can cause an additional leakage path for the process fluid.

My invention overcomes these limitations in as much as my stem guide is floatingly arranged within the packing portion of the valve bonnet. Allowing radial clearances between the guide exterior and the packing bore, allows the stem to align itself with the plug and seat ring center after which the stem packing is compressed to lock in the correct location of each guide bushing in respect to the plug center.

One common problem with spring-opposed diaphragm actuating devices is that upon disassembly, the spring load is suddenly released which constitutes a safety hazard. My invention provides a novel means to retain the spring and thereby overcome this problem.

Another way to avoid high friction is to have the valve stem disconnected from the stem of the actuating device. This way the valve stem can move radially away from the center of the actuator (caused by normal machine misalignment) thus avoiding bending forces causing friction. To this end, the actuator only provides a downwards force while a return spring attached to the tip of the valve stem pulls the latter up and maintains close contact with an actuator stem. Furthermore, I found a way to adjust the initial travel position or zero setting of the actuator without resorting to penetrating levers or adjustment screws prone to leak and to add significant cost to the valve.

DESCRIPTION OF DRAWINGS

In the accompanying drawing:

FIG. 1 is a centered cross-sectional view of the invention with a plug having a parabolic contour and is shown in the closed position.

FIG. 2 shows an enlarged cross-sectional view of the upper central portion of my invention including a valve stem guide, a packing, and a spring arrangement.

FIG. 3 shows an enlarged cross-sectional view of the central parts of my invention including a valve plug having a v-notch plug being in the open position.

DESCRIPTION OF THE INVENTION

Referring back to FIG. 1, my invention is comprised of housing 3 having a threaded inlet port 4 and a similar outlet port 5 capable of connecting fluid in a piping system. Housing 3, furthermore, has a vertical passage 6 with a smaller threaded extension 7. This threaded portion retains an orifice member 8 having a central, step-down passage which has an enlarged guide diameter 10, a step-down diameter portion 11, and a lower seat ring bore 12. A collar 13 is fitted with a smaller clearance to slide within the step-down diameter portion 11, a seal ring 14 made from a deformable material, such as PTFE, is placed between collar 13, and the terminating shoulder 15 of step-down diameter portion 11. A cylindrical valve plug 16 having an enlarged head portion 17 is fitted with close clearance in the seat ring bore 12. This plug, furthermore, has a seating portion 19 and a further reduced fluid controlling portion 20. In the closed valve position, the upper diameter part of the fluid controlling portion 20 is in close diametrical contact with the bore of collar 13 and seal ring 14, and finally the seat ring bore 12. The seating portion 19 is designed to be able to compress the upper portion of collar 13 and, therefore, compress seal ring 14. This will force seal ring 14 to reduce its diameter until firm contact with the upper exterior diameter along the distance "l" of the lower fluid controlling portion 20 is achieved to prevent leakage from the high pressure of inlet port 4 to the low pressure of outlet port 5. Collar 13 has a gradually expanding upper opening along angle α to conduct fluid coming through groove 45; for example, whenever the valve travel exceeds distance "l."

During normal opening of the valve, valve plug 16 is in the upper position as shown in FIG. 3. Here a combination retaining ring and circular wave spring 21 placed within a groove 21a will exert a force on collar 13 and, therefore, seal ring 14. This is not sufficient for shut off, but enough to maintain close contact between seal ring 14 and fluid controlling portion 20 in order to prevent clearance flow between plug and seal ring in the low lift position.

Valve stem 28 is guided within the confines of bonnet 23 by two guide bushings 40 each having an enlarged shoulder portion 41 the outer extremity of which is in close contact with stem packing 27. Both the guide bushing main diameter and the diameter of the enlarged shoulder portion 41 are provided with a generous radial clearance "S" in reference to the retaining bores or the packing bore 42 respectively. During assembly, plug 16 is inserted into seat ring bore 12 which automatically places stem 28 in the same concentric position which may or not lie the center of packing bore 42. However, both guides 41 will conform to this "correct" central axis by sliding sideways within clearance "S" to the true location. This new-found location is then locked in by turning packing nut 37 and thereby deforming the stem packing 27 sufficiently to lock both guide bushings into position while at the same time sealing the stem. To close the vertical body passage 6, I employ the bonnet 23 which is sealed against the housing via suitable gasket means 24 compressed by a number of studs 25.

Bonnet 23 has an upper threaded portion 26 containing therein a valve packing 27 and a valve stem 28. An actuating device 29 having a lower yoke portion 30 which slidingly engages the threaded portion 26 with the bored lower extension 31 having two flattened surfaces 32. Extension 31 is spaced and retained by two nuts 33. Actuator device 29, furthermore, has a cylinder bore 34 containing therein a piston 35 which can be motivated upward by compressed air overcoming the force of a return spring 36. Piston 35, which is sealed by a rolling diaphragm 44, is capable of moving up by compressing spring 36. This will allow stem 28 to travel upwards motivated by the compression force of a spring 12 retained within a packing nut 37 and attached to stem 28 via a washer 38 and retaining ring 39, and the fluid pressure acting on the cross-sectional area of orifice 12, thereby allowing plug 16 to move up and allowing fluid to pass through the cross-section area of a splined exterior groove 45 past seal ring 14 and into outlet port 5. In the configuration shown in FIG. 1, fluid controlling portion 20 has a parabolic shape which is suitable for the more larger flow capacities utilized with my invention. Note that the lower extension 35a of piston 35 has a lower recess 46 which allows ample radial clearance to stem 28. In order to retain the force of return spring 36, which is normally precompressed to provide a minimum force to shut the valve when no air signal is present, my piston 35 has an upper rim 47 with a rounded gripping portion 48. The cylinder bore 34, furthermore, has a groove 49 containing therein a circular retaining ring 50. Upon removal of bolts 51, the top portion 52 of actuator 29 will separate from yoke 30 and, as a result, spring 36 will expand a short distance until gripping portion 48 of piston 35 is in contact with retaining ring 50 and thus stops further expansion of spring 36. The shape of upper rim 47 is configured to engage the inside of retaining ring 50, after making contact, to actively prevent any accidental, or wilful, removal of retaining ring 50, which would otherwise prove to be very dangerous.

While the present invention has been described in a preferred embodiment, nothing should distract from the scope of my attached claims by making numerous modifications. For example, instead of being bolted to housing 3, bonnet 23 can just as well be threadingly engaged to housing 3, and instead of valve stem 28 being detachable from piston 35, both could be permanently interconnected if so desired while stem 28 and plug portion 17 could be threadingly engaged. Also, the inlet and outlet ports could be exchanged to reverse the flow direction if so desired.

Having thus described what is new and what constitutes my invention, I hereby claim the following:

1. The small flow control valve with cartridge type seating arrangement comprises
   a) a valve housing having an inlet port and outlet port for allowing fluid to flow through the valve;
   b) a valve plug positioned within the housing and between the inlet port and the outlet port to control the amount of fluid flowing through the valve;
   c) a deformable seal placed between the valve plug and the outlet port;
   d) a bias means for deforming the seal around the plug only when the plug is in a nearly closed valve position thereby preventing fluid form flowing past the plug;
   e) a bonnet attached to said valve housing, and
   f) an actuating means for motivating said valve plug, wherein said actuating means has an internal, spring-loaded piston operating within a cylindrical bore having a grooved section wherein said groove contains a partially inserted retaining ring, and wherein said piston has a cup-shaped portion whose outer rim is configured to be able to engage and to retain the non-inserted portion of said retaining ring in order to prevent the reduction of said spring load below a desired level.

2. Small flow control valve with cartridge type seating arrangement comprises
   a) a housing (3) having fluid connecting inlet and outlet ports (4) (5), and a vertical passage (6) interconnecting said inlet and outlet ports;
   b) an orifice member (8) suitably retained within said central vertical passage of said housing and having a central longitudinal bore (10) with a stepped down diameter portion (11), and a smaller lower seat ring bore (12);
   c) a collar (13) having an exterior dimension which slidingly engages the stepped-down diameter portion (11) and a central bore having a diameter approximately equal to the smaller lower seat ring bore (12) diameter of said orifice member;
   d) a flexible spring means (21) suitably retained within the diameter of said orifice member for exerting a preselected compression force on said collar;
   e) a deformable seal ring (14) retained within said stepped-down diameter portion between said seat ting portion of said orifice member and said collar;
   f) a generally cylindrical valve plug (17) having a seating portion (19), and a reduced fluid controlling portion (20) slidingly engaging said collar; wherein, the seating portion is capable of compressing said seal ring around parts of said fluid controlling portion of said plug; and
   g) valve actuating means (29) for sliding the valve plug along the axis of the orifice member.

3. The small control valve with cartridge type seating arrangement of claim 2, wherein the deformable seal (14) is made from PTFE material.

4. The small control valve with cartridge type seating arrangement of claim 2, wherein the spring element (21) comprises a wave spring located externally from the valve seal biasing said collar against the seal to deform the seal.

5. The small control valve with cartridge type seating arrangement of claim 2, wherein the spring element (21) comprises a conical Belleville-type spring washer located externally from the valve seal biasing said collar against the seal to deform the seal.

6. The small control valve with cartridge type seating arrangement of claim 2, wherein the valve plug (17) has a fluid controlling portion, a substantial distance in length of which has a splined exterior groove (45).

7. The small control valve with cartridge type seating arrangement of claim 2, wherein the valve plug (17) has a fluid controlling portion wherein a substantial distance in length of said flow controlling portion of said plug has a parabolic contour (16).

8. The small control valve with cartridge type seating arrangement of claim 2, wherein said actuating means (29) has a lower yoke portion and a bonnet having a threaded portion with two nuts (33) straddling the lower yoke portion of the actuator for exerting a downward force onto said valve plug, whereby the distance between the valve actuating means and the valve housing can be adjusted by a change in the location of the two nuts engaging said threaded bonnet portion.

9. The small control valve with cartridge type seating arrangement of claim 2, wherein said actuating means (29) furthermore has an internal, spring-loaded piston (35) operating within a cylindrical bore (34) having a grooved section (49) wherein said groove contains a partially inserted retaining ring (50), and wherein said piston has a cup shaped portion (47) whose outer rim is configured to be able to engage and to retain the non-inserted portion of said retaining ring in order to prevent the reduction of said spring load below a desired level.

10. The small control valve with cartridge type seating arrangement of claim 2, wherein said bonnet (23) has a bore that contains a stem packing (27) and which retains a pair of guide bushings (40) placed above and below such stem packing and engaging said stem, the latter being interspaced between said valve plug and said actuating device, and wherein said guide bushings have sufficient radial clearance within said bonnet bore to allow for radial displacement from the center of said bore in order to follow any misalignment of said valve stem vis-a-vis said bonnet bore, and whereby the new found location of said guide bushing can be locked in place by compressing said packing.

11. The small control valve with cartridge type seating arrangement of claim 2, wherein the center bore of said collar is tapered.

* * * * *